United States Patent
Lee et al.

(10) Patent No.: US 12,151,969 B2
(45) Date of Patent: Nov. 26, 2024

(54) APPARATUS AND METHOD FOR MANUFACTURING TEMPERED GLASS

(71) Applicant: SAMSUNG DISPLAY CO., LTD., Yongin-si (KR)

(72) Inventors: Hyunji Lee, Yongin-si (KR); Yongkyu Kang, Yongin-si (KR); Hoikwan Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 423 days.

(21) Appl. No.: 17/706,843

(22) Filed: Mar. 29, 2022

(65) Prior Publication Data

US 2022/0363593 A1    Nov. 17, 2022

(30) Foreign Application Priority Data

May 11, 2021  (KR) .......................... 10-2021-0060738

(51) Int. Cl.
*C03C 21/00*  (2006.01)
(52) U.S. Cl.
CPC .................................. *C03C 21/002* (2013.01)
(58) Field of Classification Search
CPC .................................................... C03C 21/002
See application file for complete search history.

(56) References Cited

U.S. PATENT DOCUMENTS

| | | | |
|---|---|---|---|
| 10,071,933 B2 | 9/2018 | Wang et al. | |
| 10,189,743 B2 | 1/2019 | Zadesky et al. | |
| 2018/0148373 A1* | 5/2018 | Harris | ...................... B08B 9/42 |
| 2019/0062207 A1 | 2/2019 | Jin | |

FOREIGN PATENT DOCUMENTS

| | | | | |
|---|---|---|---|---|
| CN | 108706891 A | * | 10/2018 | .......... C03C 21/002 |
| JP | 2001-344743 | | 12/2001 | |
| JP | 6814181 | | 12/2020 | |
| KR | 10-1684344 | | 12/2016 | |
| KR | 10-1775811 | | 9/2017 | |
| KR | 10-1825276 | | 2/2018 | |
| WO | WO-2013161651 A1 | * | 10/2013 | .......... C03C 21/002 |

* cited by examiner

*Primary Examiner* — Cynthia Szewczyk
(74) *Attorney, Agent, or Firm* — F. CHAU & ASSOCIATES, LLC

(57) ABSTRACT

A tempered glass manufacturing apparatus includes a loading unit for loading sheets of glass therein. A heating unit receives the loading unit having sheets of glass loaded therein. The heating unit includes first to third openings. A tempering unit is connected to the heating unit through the first opening and receives the loading unit having sheets of glass loaded therein. The tempering unit performs a tempering process on the sheets of glass when the loading unit is positioned in the tempering unit. A residual salt discharging unit is connected to the heating unit through the second opening. An auxiliary layer providing unit is connected to the heating unit through the third opening of the heating unit. The auxiliary layer providing unit includes auxiliary layers for performing a residual salt preprocessing process to increase a removal of residual salt provided on surfaces of the sheets of glass.

20 Claims, 16 Drawing Sheets

APPARATUS AND METHOD FOR MANUFACTURING TEMPERED GLASS

CROSS-REFERENCE TO RELATED APPLICATION

This application claims priority under 35 U.S.C. § 119 to Korean Patent Application No. 10-2021-0060738, filed on May 11, 2021 in the Korean Intellectual Property Office, the disclosure of which is incorporated by reference in its entirety herein.

TECHNICAL FIELD

The present inventive concept relates to an apparatus and method for manufacturing tempered glass, and more particularly, to an apparatus and method for manufacturing tempered glass, in which a removal of residual salt formed on a glass surface during a tempering process is increased.

DISCUSSION OF RELATED ART

Glass is provided in display panels and display devices to have strength characteristics greater than or equal to a desired level. For example, tempered glass manufactured by applying a tempering process is used in display panels and display devices to provide a desired level of strength.

Such tempered glass may be manufactured through a chemical tempering process. For example, the chemical tempering process may include a process of providing a chemical tempered layer in which compression stress occurs, through a process of substituting an alkali metal ion, such as sodium and lithium, included in glass with a potassium ion having a relatively greater ion radius than the alkali metal ion.

However, in an apparatus and method for manufacturing tempered glass residual salt may be provided on a surface of glass during a tempering process which may result in a decrease in the quality of the glass.

SUMMARY

One or more embodiments of the present inventive concept include an apparatus and method for manufacturing tempered glass, in which an effect of removing residual salt provided on a surface of glass during a tempering process is increased. However, these objectives are examples and do not limit the scope of the present inventive concept.

Additional aspects will be set forth in part in the description which follows and, in part, will be apparent from the description, or may be learned by practice of the embodiments of the present inventive concept.

According to an embodiment of the present inventive concept, a tempered glass manufacturing apparatus includes a loading unit configured for loading sheets of glass therein. A heating unit is configured to receive the loading unit having sheets of glass loaded therein. The heating unit includes first to third openings. A tempering unit is connected to the heating unit through the first opening and is configured to receive the loading unit having sheets of glass loaded therein. The tempering unit is configured for performing a tempering process on the sheets of glass when the loading unit is positioned in the tempering unit. A residual salt discharging unit is connected to the heating unit through the second opening. An auxiliary layer providing unit is connected to the heating unit through the third opening of the heating unit. The auxiliary layer providing unit includes auxiliary layers for performing a residual salt preprocessing process to increase a removal of residual salt provided on surfaces of the sheets of glass.

In an embodiment, a tempering solution including a first ion disposed within the tempering unit, and the tempering process may include a process of substituting at least a portion of a second ion included in the sheets of glass with the first ion by dipping the loading unit having the sheets of glass loaded therein in the tempering solution.

In an embodiment, an ion radius of the first ion may be greater than an ion radius of the second ion.

In an embodiment, an upper surface of the residual salt discharging unit is configured to receive residual salt that is displaced from the sheets of glass loaded in the loading unit.

In an embodiment, the upper surface of the residual salt discharging unit may have a mesh structure.

In an embodiment, the auxiliary layer providing unit may provide the auxiliary layers into the heating unit when the loading unit is arranged on the second opening of the heating unit.

In an embodiment, the auxiliary layers provided into the heating unit may be inserted between the sheets of glass, respectively, and directly contact the residual salt provided on the surfaces of the sheets of glass.

In an embodiment, the auxiliary layers may include a third ion, and the residual salt preprocessing process includes an ion substitution reaction that is performed when the residual salt provided on the surfaces of the sheets of glass directly contact the auxiliary layers, the ion substitution reaction including a substitution of at least a portion of a fourth ion included in the residual salt with the third ion.

In an embodiment, a viscosity of the residual salt after the ion substitution reaction may be less than a viscosity of the residual salt before the ion substitution reaction.

In an embodiment, a melting point of the residual salt after the ion substitution reaction may be less than a melting point of the residual salt before the ion substitution reaction.

According to an embodiment of the present inventive concept, a method of manufacturing tempered glass includes placing a loading unit having sheets of glass loaded therein within a heating unit having first to third openings, moving the loading unit into a tempering unit through the first opening of the heating unit, and tempering the sheets of glass, placing the loading unit on the second opening within the heating unit after the tempering of the sheets of glass, receiving auxiliary layers from an auxiliary layer providing unit through the third opening of the heating unit, and inserting the auxiliary layers between the sheets of glass, respectively, and discharging residual salt provided on surfaces of the sheets of glass into a residual salt discharging unit through the second opening.

In an embodiment, a tempering solution including a first ion may be disposed within the tempering unit, and the tempering of the sheets of glass may include dipping the loading unit into the tempering solution, and substituting at least a portion of a second ion included in the sheets of glass with the first ion.

In an embodiment, an ion radius of the first ion may be greater than an ion radius of the second ion.

In an embodiment, the residual salt may be movable into the residual salt discharging unit from the sheets of glass loaded in the loading unit via an upper surface of the residual salt discharging unit.

In an embodiment, the upper surface of the residual salt discharging unit may have a mesh structure.

In an embodiment, the auxiliary layer providing unit includes auxiliary layers for performing a residual salt preprocessing process to increase a removal of the residual salt formed on the surfaces of sheets of glass, and the auxiliary layer providing unit may provide the auxiliary layers into the heating unit when the loading unit is arranged on the second opening of the heating unit.

In an embodiment, the auxiliary layers provided into the heating unit may be inserted between the sheets of glass, respectively, and may directly contact the residual salt provided on the surfaces of the sheets of glass.

In an embodiment, the auxiliary layers may include a third ion, and the residual salt preprocessing process includes an ion substitution reaction that is performed when the residual salt directly contacts the auxiliary layers, the ion substitution reaction including a substitution of at least a portion of a fourth ion included in the residual salt with the third ion.

In an embodiment, a viscosity of the residual salt after the ion substitution reaction may be less than a viscosity of the residual salt before the ion substitution reaction.

In an embodiment, a melting point of the residual salt after the ion substitution reaction may be less than a melting point of the residual salt before the ion substitution reaction.

According to an embodiment of the present inventive concept, a method of manufacturing tempered glass includes performing a tempering process on sheets of glass that include a residual salt provided on surfaces thereof. The residual salt has a first ion. Auxiliary layers are inserted between the sheets of glass after the tempering process is performed. The auxiliary layers have a second ion. An ion substitution reaction is performed between the first and second ions when the residual salt directly contacts the auxiliary layers. The residual salt is removed from the sheets of glass after the ion substitution reaction is performed.

Other aspects, features, and advantages other than those described above will become apparent from the accompanying drawings, the appended claims, and the detailed description of the present disclosure.

These general and specific aspects may be carried out using a system, a method, a computer program, or any combinations thereof.

BRIEF DESCRIPTION OF THE DRAWINGS

The above and other aspects, features, and advantages of embodiments of the present inventive concept will be more apparent from the following description taken in conjunction with the accompanying drawings, in which.

DETAILED DESCRIPTION OF EMBODIMENTS

Figure 1:
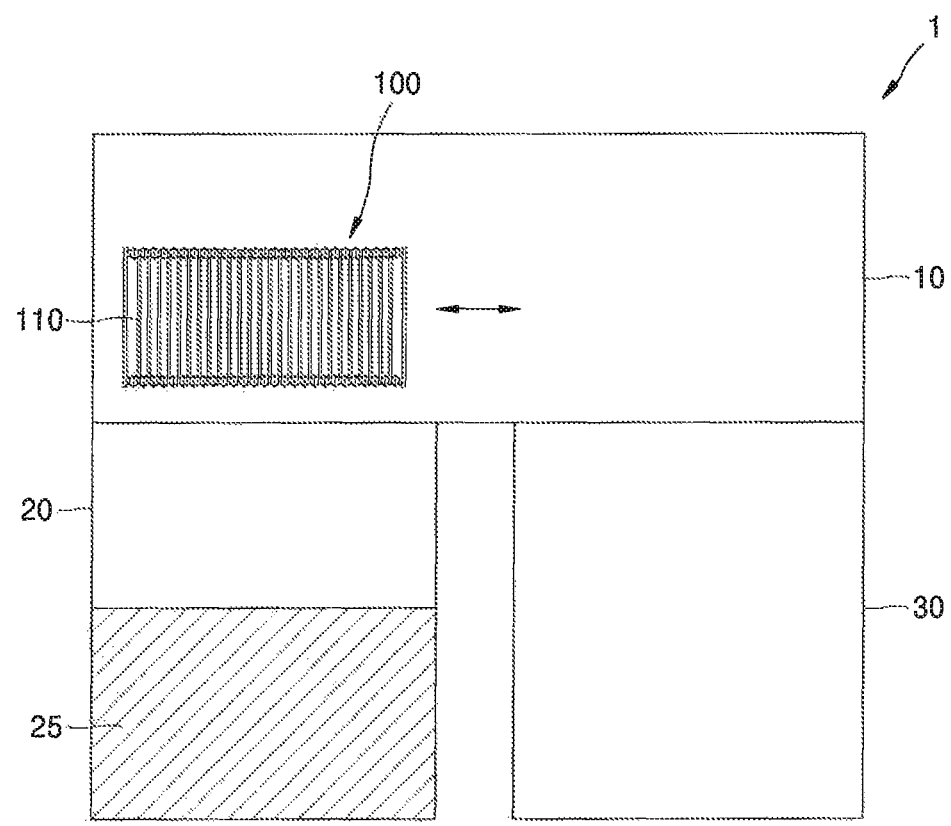
FIG. 1 is a cross-sectional view schematically illustrating a portion of a tempered glass manufacturing apparatus according to an embodiment of the present inventive concept.

Reference will now be made in detail to embodiments of the present inventive concept, examples of which are illustrated in the accompanying drawings, wherein like reference numerals refer to like elements throughout the present disclosure. In this regard, the present embodiments may have different forms and configuration and should not be construed as being limited to the descriptions set forth herein. Accordingly, embodiments are merely described below, by referring to the figures, to explain aspects of the present inventive concept. As used herein, the term "and/or" includes any and all combinations of one or more of the associated listed items. Throughout the present disclosure, the expression "at least one of a, b or c" indicates only a, only b, only c, both a and b, both a and c, both b and c, all of a, b, and c, or any variations thereof.

Since the present inventive concept may have diverse modified embodiments, embodiments are illustrated in the drawings and are described with respect to such embodiments. An effect and a characteristic of the present inventive concept, and a method of accomplishing them will be apparent by referring to embodiments described with reference to the drawings. The present inventive concept may, however, be embodied in many different forms and configurations and should not be construed as limited to the embodiments set forth herein.

In an embodiment below, terms such as "first" and "second" are used herein merely to describe a variety of constituent elements, but the constituent elements are not limited by the terms. Such terms are used only for the purpose of distinguishing one constituent element from another constituent element.

An expression used in the singular encompasses an expression of the plural unless the context expressly indicates otherwise.

It will be understood that the terms "comprises" and/or "comprising" used herein specify the presence of stated features or elements, but do not preclude the presence or addition of one or more other features or elements.

It will be further understood that when a layer, area, or element is referred to as being "formed on" another layer, area, or element, it can be directly or indirectly formed on the other layer, region, or element. For example, one or more intervening layers, areas, or elements may be present therebetween. However, when a layer, area, or element is referred to as being "directly formed on" another layer, area, or element, no intervening layers, areas, or elements may be present therebetween.

In the drawings, sizes of components in the drawings may be exaggerated or reduced for convenience of explanation and not for limitation.

For example, an embodiment may be implemented differently by modifying a certain process order from the described order. For example, two consecutively described processes may be performed substantially at the same time or performed in an order opposite to the described order.

In the present disclosure, the term "and/or" includes any and all combinations of one or more of the associated listed items. For example, "A and/or B" may include "A," "B," or "A and B." Throughout the present disclosure, the expression "at least one of a, b, or c" indicates only a, only b, only c, both a and b, both a and c, both b and c, all of a, b, and c, or any variations thereof.

It will be understood that when a layer, region, or component is referred to as being connected to another layer, region, or component, it can be directly or indirectly connected to the other layer, region, or component. For example, intervening layers, regions, or components may be present. For example, when layers, areas, or elements or the like are referred to as being "electrically connected," they may be directly electrically connected, or layers, areas or elements may be indirectly electrically connected, and an intervening layer, region, component, or the like may be present therebetween. However, when a layer, region, or component is referred to as being directly connected to another layer, region, or component, no intervening layers, regions, or components may be present.

One or more embodiments of the present inventive concept will be described below in more detail with reference to the accompanying drawings. Components that are the same or are in correspondence with each other are rendered the same reference numeral regardless of the figure number, and redundant explanations are omitted.

Figure 2:
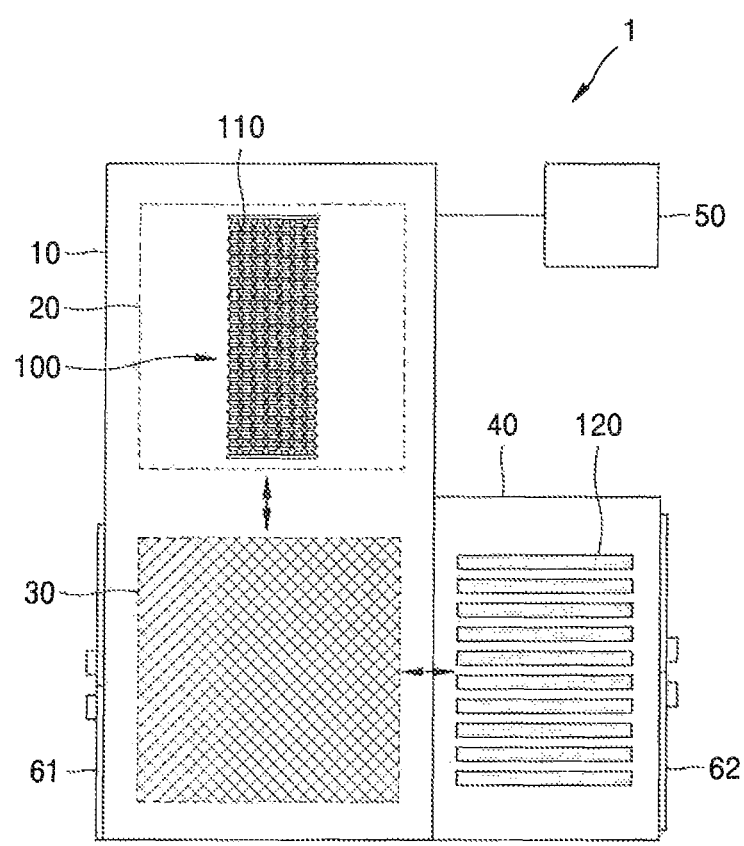
FIG. 2 is a plan view schematically illustrating a portion of a tempered glass manufacturing apparatus according to an embodiment of the present inventive concept.

FIG. 1 is a cross-sectional view schematically illustrating a portion of a tempered glass manufacturing apparatus 1 according to an embodiment of the present inventive concept, and FIG. 2 is a plan view schematically illustrating a portion of the tempered glass manufacturing apparatus 1 according to an embodiment of the present inventive concept.

The tempered glass manufacturing apparatus 1 according to an embodiment may include an apparatus for manufacturing tempered glass with increased strength characteristics by performing a tempering process on glass. In this embodiment, the tempered glass may include tempered glass provided in a display device and a display panel. In addition, the display apparatus and the display panel may respectively include a display apparatus and a display panel that may be provided in various electronic apparatuses such as mobile phones, tablet personal computers (PCs), laptop computers, and smart watches. However, embodiments of the present inventive concept are not limited thereto and the tempered glass may be provided in various other small, medium or large-sized electronic apparatuses.

In an embodiment, a tempering process performed by the tempered glass manufacturing apparatus 1 may include a chemical tempering process, and may include a process of generating a compressive strength in a surface area of the glass, and generating a tensile strength in an internal area of the glass.

In an embodiment, the tempering process performed by the tempered glass manufacturing apparatus 1 may include an ion exchange process performed on a surface of glass to be tempered by using a tempering solution 25. For example, in the tempered glass manufacturing apparatus 1, an ion on the glass surface may be substituted with an ion having a relatively greater ion radius, thereby generating a compressive strength on the surface area of the glass, and thus, tempered glass with increased glass strength characteristics may be manufactured.

As shown in FIGS. 1 and 2, the tempered glass manufacturing apparatus 1 according to an embodiment may include a heating unit 10, a tempering unit 20, a residual salt discharging unit 30, an auxiliary layer providing unit 40, and a controller 50. In addition, in an embodiment, a loading unit 100 may be placed inside the tempered glass manufacturing apparatus 1 or may be moved to the outside of the tempered glass manufacturing apparatus 1. In addition, an auxiliary layer 120, such as a plurality of auxiliary layers 120, may be provided within the auxiliary layer providing unit 40.

In an embodiment, the heating unit 10 may have therein a space in which the loading unit 100 may be accommodated. In an embodiment, the loading unit 100 may be placed into the heating unit 10 and movable. For example, in the heating unit 10, the loading unit 100 may move in left and right directions and/or up and down directions in a cross-sectional view. However, embodiments of the present inventive concept are not limited thereto and the loading unit 100 may move in various different directions. For example, the loading unit 100 positioned inside the heating unit 10 may move in the left and right directions in a cross-sectional view as shown in FIG. 1, and may be positioned above the tempering unit 20 or the residual salt discharging unit 30. In addition, the loading unit 100 may move in the up and down directions in a cross-sectional view, and move from the heating unit 10 to the tempering unit 20 or from the tempering unit 20 to the heating unit 10. In an embodiment, the heating unit 10 may include a heater that increases a temperature in the heating unit 10, a motor capable of moving the loading unit 100, etc.

The temperature in the heating unit 10 may be controlled to be within a temperature range preset by the controller 50. For example, as shown in FIG. 2, the heating unit 10 may be electrically connected to the controller 50. In an embodiment, an internal temperature of the heating unit 10 may be maintained at a temperature greater than or equal to a melting point of the tempering solution 25 or a melting point of residual salt rs (see FIG. 9).

In an embodiment, the heating unit 10 may have a first opening and a second opening in a lower surface thereof, and may have a third opening in a lateral side surface thereof. Here, "the first opening" may include a passage for connecting the heating unit 10 and the tempering unit 20 positioned below the heating unit 10 to each other. "The second opening" may include a passage for connecting the heating unit 10 and the residual salt discharging unit 30 positioned below the heating unit 10 to each other. "The third opening" may include a passage for connecting the heating unit 10 and the auxiliary layer providing unit 40 positioned adjacent to a lateral side portion of the heating unit 10 to each other.

In an embodiment, the tempering unit 20 may be positioned below the heating unit 10, and may be connected to the heating unit 10 through the first opening defined in a lower surface of the heating unit 10. Accordingly, the loading unit 100 positioned inside the heating unit 10 may move into the tempering unit 20 via the first opening, for a tempering process. However, embodiments of the present inventive concept are not limited thereto and the arrangement of the heating unit 10, tempering unit 20, residual salt discharging unit 30 and auxiliary layer providing unit 40 with respect to each other and the first to third openings may vary.

When the loading unit 100 is positioned within the tempering unit 20, the tempering unit 20 may perform a tempering process on sheets of glass 110 loaded in the loading unit 100. In this embodiment, "the tempering process" may include the ion exchange process described above, and the tempering solution 25 may be disposed within the tempering unit 20. For example, the tempering solution 25 including a first ion may be disposed within the tempering unit 20. In addition, the sheets of glass 110 may include a second ion.

The loading unit 100 having the sheets of glass 110 loaded therein may move into the tempering unit 20 via the first opening defined in the lower surface of the heating unit 10, and within the tempering unit 20, a tempering process, such as an ion exchange process, may be performed on the sheets of glass 110 loaded in the loading unit 100. In an embodiment, the ion exchange process may include a process of dipping the sheets of glass 110 in the tempering solution 25 including the first ion, and substituting at least a portion of a second ion included in surfaces of the sheets of glass 110 with the first ion included in the tempering solution 25. However, embodiments of the present inventive concept are not limited thereto and the tempering solution 25 may be applied to the sheets of glass 110 by various different means and is not limited to a dipping process. The tempering solution 25 used in the ion exchange process may be in a liquid state at a high temperature. As pores of the surfaces of the sheets of glass 110 contained in the tempering solution 25 in a liquid state at a high temperature expand, the second ion within the sheets of glass 110 may be discharged to the outside, and an external first ion from the tempering solution 25 may be filled in a place where the second ion has been discharged. In an embodiment, an ion radius of the first ion included in the tempering solution 25 may be greater than that of the second ion included in the sheets of glass 110. For example, in the ion exchange process, ions on surfaces of the sheets of glass 110 may be substituted with ions having a relatively greater ion radius, thereby generating a compressive strength in surface areas of the sheets of glass 110, and thus, the strength characteristics of the sheets of glass 110 may be increased.

In an embodiment, the tempering solution 25 may include a compound selected from the group consisting of potassium nitrate ($KNO_3$), sodium nitrate ($NaNO_3$) or a mixture of $KNO_3$ and $NaNO_3$. In addition, the first ion included in the tempering solution 25 may include a potassium ion ($K^+$), and the second ion included in the sheets of glass 110 may include a sodium ion ($Na^+$). However, embodiments of the present inventive concept are not limited thereto and a type of ion included in the glass 110 and the tempering solution 25 may be variously modified.

During the tempering process described above, residual salt rs (see FIG. 9) may be provided on surfaces of the sheets of glass 110. The residual salt may be solidified on the surfaces of the sheets of glass 110 and may form interfacial stress. Therefore, the quality of the manufactured tempered glass may be degraded and defects may occur. In an embodiment of the present inventive concept, the tempered glass manufacturing apparatus 1 may perform a residual salt removal process for removing the residual salt rs provided on the surface of the glass 110 after the tempering process. In addition, the tempered glass manufacturing apparatus 1 may include the residual salt discharging unit 30 used in the residual salt removal process and the auxiliary layer providing unit 40.

In an embodiment, the residual salt discharging unit 30 may be positioned below the heating unit 10, and may be spatially connected to the heating unit 10 via a second opening defined in the lower surface of the heating unit 10. In an embodiment, during the residual salt removal process, the loading unit 100 may be moved to overlap the residual salt discharging unit 30 and be positioned above the residual salt discharging unit 30 within the heating unit 10. In addition, the loading unit 100 may be positioned on the second opening and may overlap the second opening in the heating unit 10. In an embodiment the residual salt rs (see FIG. 9) provided on the surfaces of the sheets of glass 110 loaded in the loading unit 100 arranged on the second opening may move in a downward direction (e.g., by gravity, etc.). The residual salt rs that has moved in the downward direction may be separated from the surfaces of the sheets of glass 110 and may move into the residual salt discharging unit 30 via the second opening. The residual salt discharging unit 30 may receive and discharge the residual salt rs inflowing from the heating unit 10.

In an embodiment, as shown in FIG. 2, the residual salt discharging unit 30 may have an upper surface having a mesh structure. Accordingly, the residual salt rs (see FIG. 9) may move from the heating unit 10 into the residual salt discharging unit 30 through the upper surface of the residual salt discharging unit 30 via through holes included in the mesh structure. Thus, the upper surface of the residual salt discharging unit 30 may receive the residual salt displaced from (e.g., removed from) the surfaces of the sheets of glass 110.

When a melting point of the residual salt rs (see FIG. 9) is relatively high, the residual salt rs may be solidified under high temperature conditions, thus deteriorating the mobility thereof. Accordingly, the residual salt rs may not be easily removed from the surface of the glass 110. In addition, when a viscosity of the residual salt rs is relatively large, the mobility of the residual salt rs may be deteriorated, and the residual salt rs may not be easily removed from the surface of the glass 110 to the residual salt discharging unit 30. In an embodiment of the present inventive concept, the tempered glass manufacturing apparatus 1 may increase a residual salt removal effect in a residual salt removal process by using auxiliary layers 120.

In an embodiment, the auxiliary layer providing unit 40 may have a space for accommodating the auxiliary layers 120 therein, and may provide the auxiliary layers 120 to the heating unit 10 while the residual salt removal process is performed.

In an embodiment, the auxiliary layer providing unit 40 may be positioned on a lateral side portion of the heating unit 10, and may be connected to the heating unit 10 through a third opening defined in a lateral side surface of the heating unit 10. Accordingly, the auxiliary layers 120 disposed in the auxiliary layer providing unit 40 may move into the heating unit 10 via the third opening, for the residual salt removal process.

The auxiliary layers 120 may include layers that increase a removal of the residual salt rs (see FIG. 9) provided on the surfaces of the sheets of glass 110. In an embodiment, the auxiliary layers 120 may include a zeolite coating layer and an ion exchange resin. However, embodiments of the present inventive concept are not limited thereto and the material(s) that the auxiliary layers 120 are formed from may vary. The auxiliary layers 120 may perform an ion substitution reaction to be described later, and may include any material and layer structure having heat resistance in a process temperature range. For example, the auxiliary layers 120 may be inserted between the sheets of glass 110 to reduce a melting point and/or viscosity of the residual salt rs. This will be described later with reference to FIG. 10.

The controller 50 may control a temperature in the heating unit 10 to be within a preset temperature range. In addition, a temperature in the tempering unit 20 connected to the heating unit 10 may be the same as or similar to the temperature in the heating unit 10. In an embodiment, the controller 50 may control an internal temperature of the heating unit 10 or an internal temperature of the tempering unit 20 to satisfy a tempering temperature range or a post heating temperature range.

For example, during a tempering process, the tempering temperature range may be controlled to be within a temperature range of about 350° C. to about 400° C., such as about 360° C. to about 370° C. In instances in which the tempering temperature is less than about 350° C., compression stress and a depth of layer (DOL) required for the surface of the tempered glass may not be ensured. In instances in which the tempering temperature exceeds about 400° C., it is difficult to control a tempering time and the DOL.

In addition, during a post heating process, a post heating temperature range may be controlled to be within a range of about 120° C. to about 320° C. In embodiments in which the post heating temperature is less than about 120° C., the residual salt may be solidified. In embodiments in which the post heating temperature exceeds about 320° C., there may be a loss of compression stress.

However, the tempering temperature range and the post heating temperature range are not limited to the above examples, and may be variously modified according to a thickness of the glass 110, a component of the glass 110, a strength characteristic requirement, etc.

The tempered glass manufacturing apparatus 1 according to an embodiment may include at least one open and close unit for inputting and discharging the loading unit 100 and/or the auxiliary layers 120. For example, in an embodiment, as shown in FIG. 2, the tempered glass manufacturing apparatus 1 may include a first open and close unit 61 and a second open and close unit 62. However, embodiments of the present inventive concept are not limited thereto and the number of open and close units may vary.

In an embodiment, the first open and close unit 61 may be arranged in a lateral side portion of the heating unit 10. The loading unit 100 may be moved into the heating unit 10 from the outside or may be discharged from within the heating unit 10 to the outside through the first open and close unit 61. For example, in an embodiment, the loading unit 100 having the sheets of glass 110 loaded therein prior to the tempering process may be moved into the heating unit 10 from the outside through the first open and close unit 61, and then, when the tempering process is completed, may be discharged from within the heating unit 10 to the outside through the first open and close unit 61.

In an embodiment, the second open and close unit 62 may be arranged in a lateral side portion of the auxiliary layer providing unit 40. Through the second open and close unit 62, the auxiliary layers 120 may be placed into the auxiliary layer providing unit 40 from the outside or may be discharged from within the auxiliary providing unit 40 to the outside. For example, the auxiliary layers 120 before undergoing a residual salt removal process may be placed into the auxiliary layer providing unit 40 from the outside through the second open and close unit 62, and may move into the heating unit 10 from within the auxiliary layer providing unit 40 through a third opening defined in a lateral side portion of the heating unit 10. In an embodiment, the auxiliary layers 120 after undergoing the residual salt removal process may be moved back into the auxiliary layer providing unit 40 from within the heating unit 10 through the third opening defined in the lateral side portion of the heating unit 10, and may be discharged to the outside from within the auxiliary layer providing unit 40 through the second open and close unit 62.

However, embodiments of the present inventive concept are not limited thereto and the sizes and arrangements of the first open and close unit 61 and the second open and close unit 62 described above may be variously modified. In addition, in an embodiment, one of the first open and close unit 61 and the second open and close unit 62 may be omitted, and the tempered glass manufacturing apparatus 1 may include only one open and close unit. In this embodiment, the loading unit 100 and the auxiliary layers 120 may be input and discharged through a same open and close unit.

Figure 3:
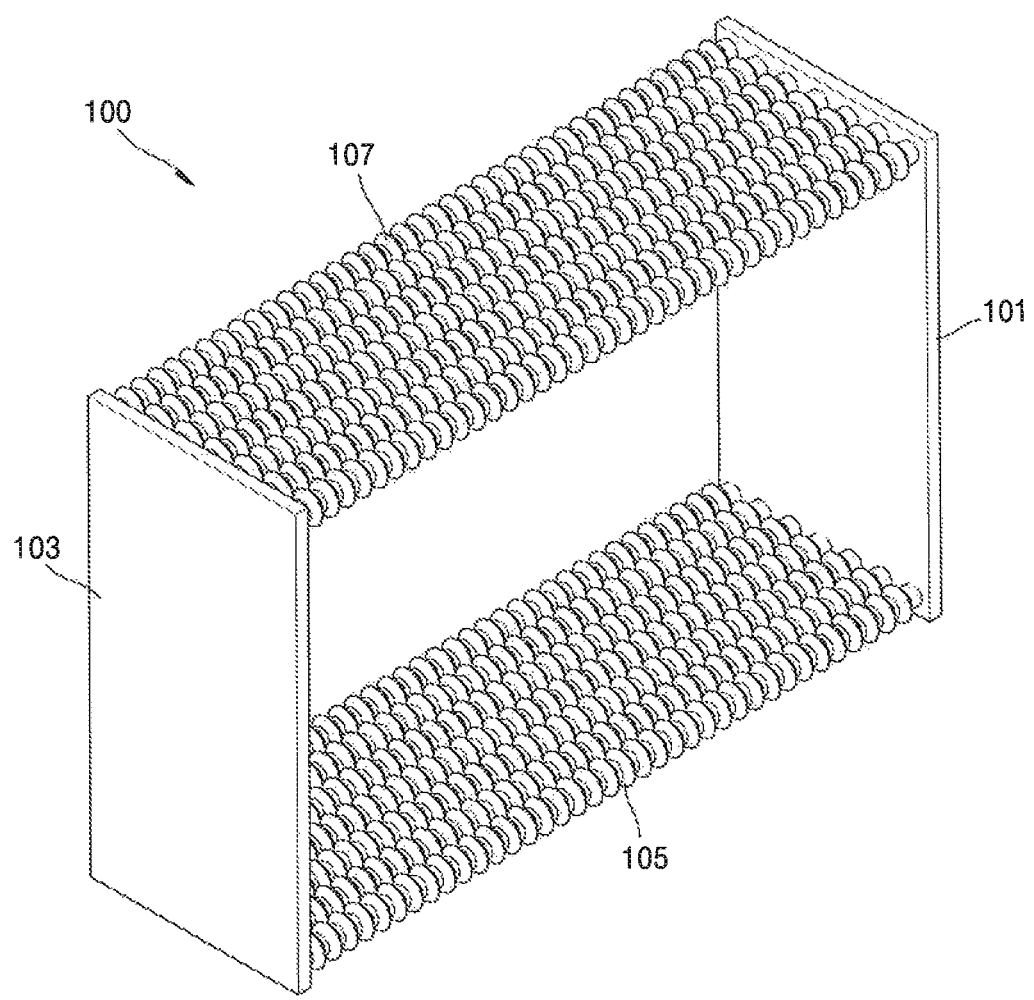
FIG. 3 is a perspective view schematically illustrating a portion of a loading unit according to an embodiment of the present inventive concept.

FIG. 3 is a perspective view schematically illustrating a portion of a loading unit 100 according to an embodiment of the present inventive concept.

In an embodiment, the loading unit 100 may receive sheets of glass 110 to be tempered, and may move within the tempered glass manufacturing apparatus 1 with the sheets of glass 110 loaded therein (see FIG. 1) according to an order of process.

As shown in FIG. 3, the loading unit 100 according to an embodiment may include a first lateral side surface support unit 101, a second lateral side surface support unit 103, a lower surface support unit 105, and an upper surface support unit 107.

The lower surface support unit 105 and the upper surface support unit 107 may face each other (e.g., in a vertical direction). The first lateral side surface support unit 101 and the second lateral side surface support unit 103 may face each other at opposite lateral ends of the lower surface support unit 105 and the upper surface support unit 107. In an embodiment, the lower surface support unit 105 and the upper surface support unit 107 may be coupled and fixed to each of the first lateral side surface support unit 101 and the second lateral side surface support unit 103 arranged at opposite lateral ends of each of the lower surface support unit 105 and the upper surface support unit 107.

In an embodiment, the lower surface support unit 105 and/or the upper surface support unit 107 may include a plurality of linear structures. The plurality of linear structures may be arranged in parallel with each other and may form a side. Each of the plurality of linear structures may include a plurality of grooves that are spaced apart from one another. Sheets of glass 110 (see FIG. 4A) may be arranged to correspond to the plurality of grooves, respectively. In an embodiment, using the loading unit 100 described above, the plurality of sheets of glass 110 may be processed simultaneously.

Figure 4A:
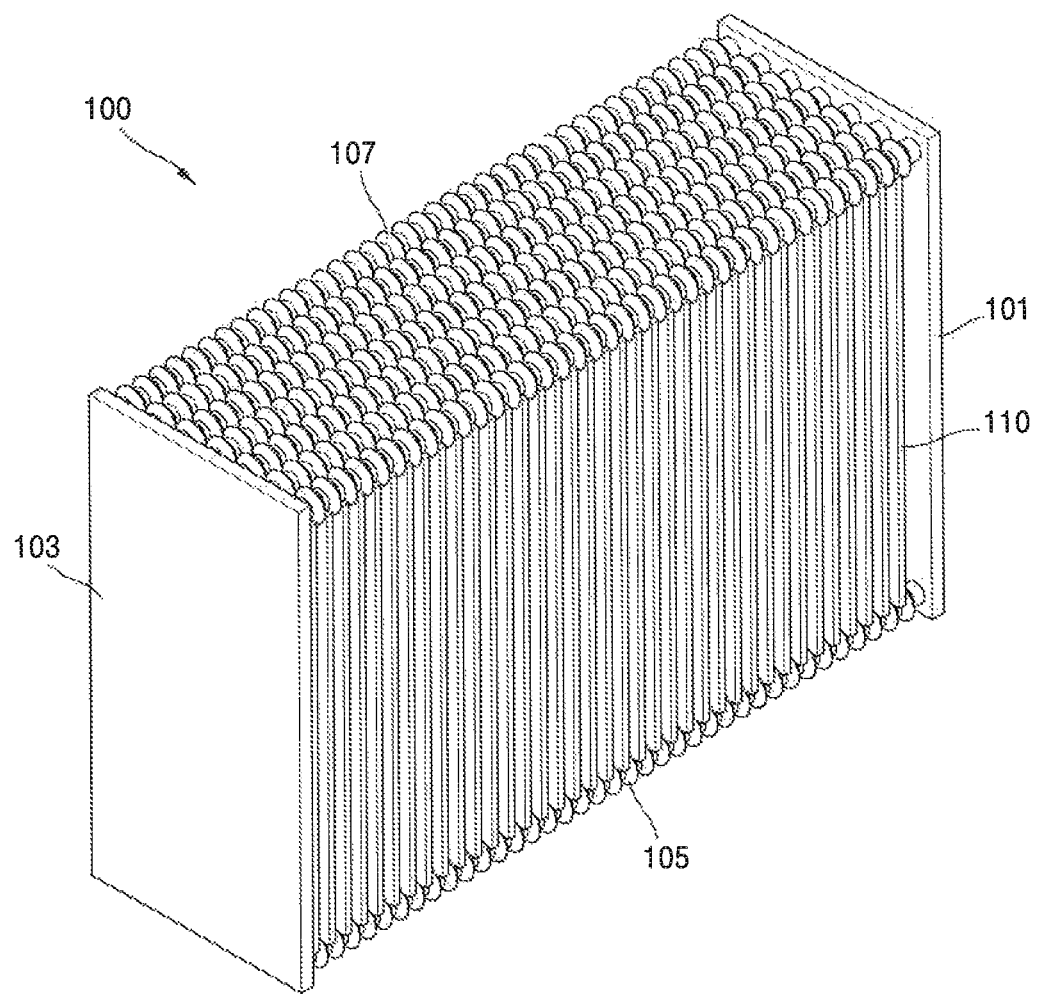
FIG. 4A is a perspective view schematically illustrating a state in which sheets of glass are inserted into a loading unit, according to an embodiment of the present inventive concept.
Figure 4B:
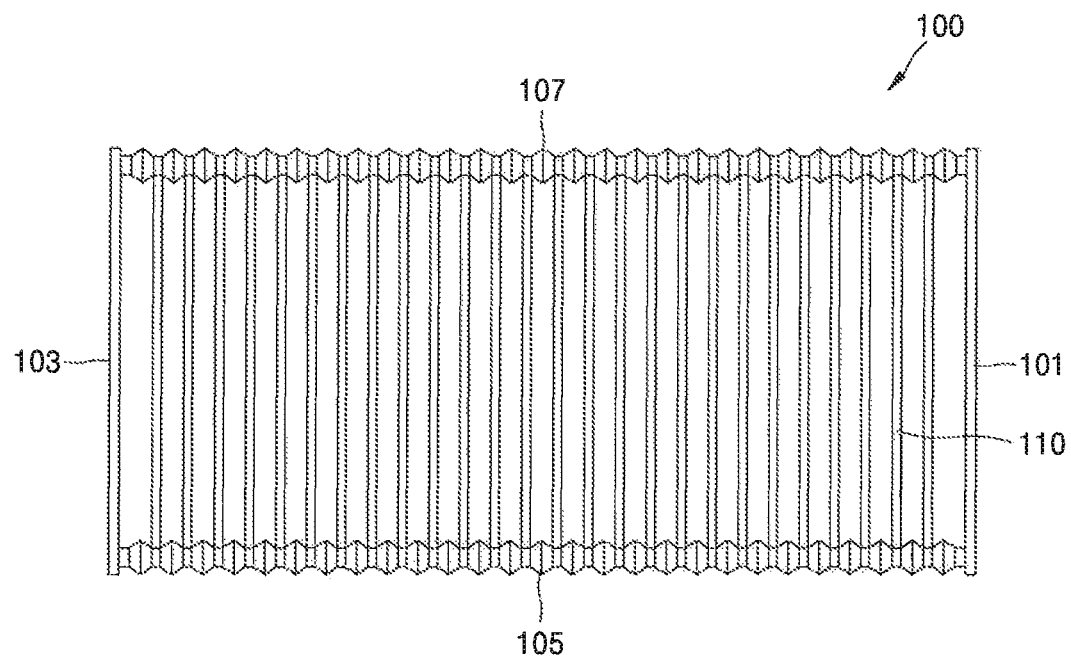
FIG. 4B is a cross-sectional view schematically illustrating a state in which sheets of glass are inserted into a loading unit, according to an embodiment of the present inventive concept.
Figure 4C:
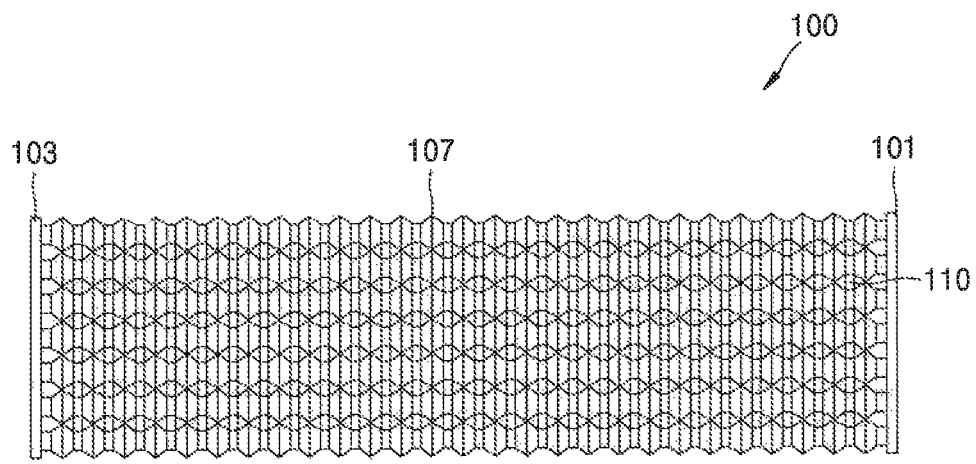
FIG. 4C is a plan view schematically illustrating a state in which sheets of glass are inserted into a loading unit, according to an embodiment of the present inventive concept.

FIG. 4A is a perspective view schematically illustrating a state in which sheets of glass are inserted into the loading unit 100, according to an embodiment of the present inventive concept, FIG. 4B is a cross-sectional view schematically illustrating a state in which sheets of glass are inserted into the loading unit 100 according to an embodiment of the present inventive concept, and FIG. 4C is a plan view schematically illustrating a state in which sheets of glass are inserted into the loading unit 100 according to an embodiment of the present inventive concept.

As shown in FIGS. 4A to 4C, a plurality of sheets of glass 110 may be inserted into the loading unit 100 and fixed. For example, the plurality of sheets of glass 110 may be arranged to correspond to a plurality of grooves included in the loading unit 100 and/or the upper surface support unit 107 of the loading unit 100. In this embodiment, the sheets of glass 110 respectively arranged in the plurality of grooves may be spaced apart from one another. Thus, the sheets of glass 110 may not come into direct contact with one another, and surfaces thereof may be exposed. In addition, the sheets of glass 110 may be arranged in parallel with each other. However, embodiments of the present inventive concept are not limited thereto and the plurality of grooves and sheets of glass 110 disposed therein may be variously arranged.

Figure 5A:
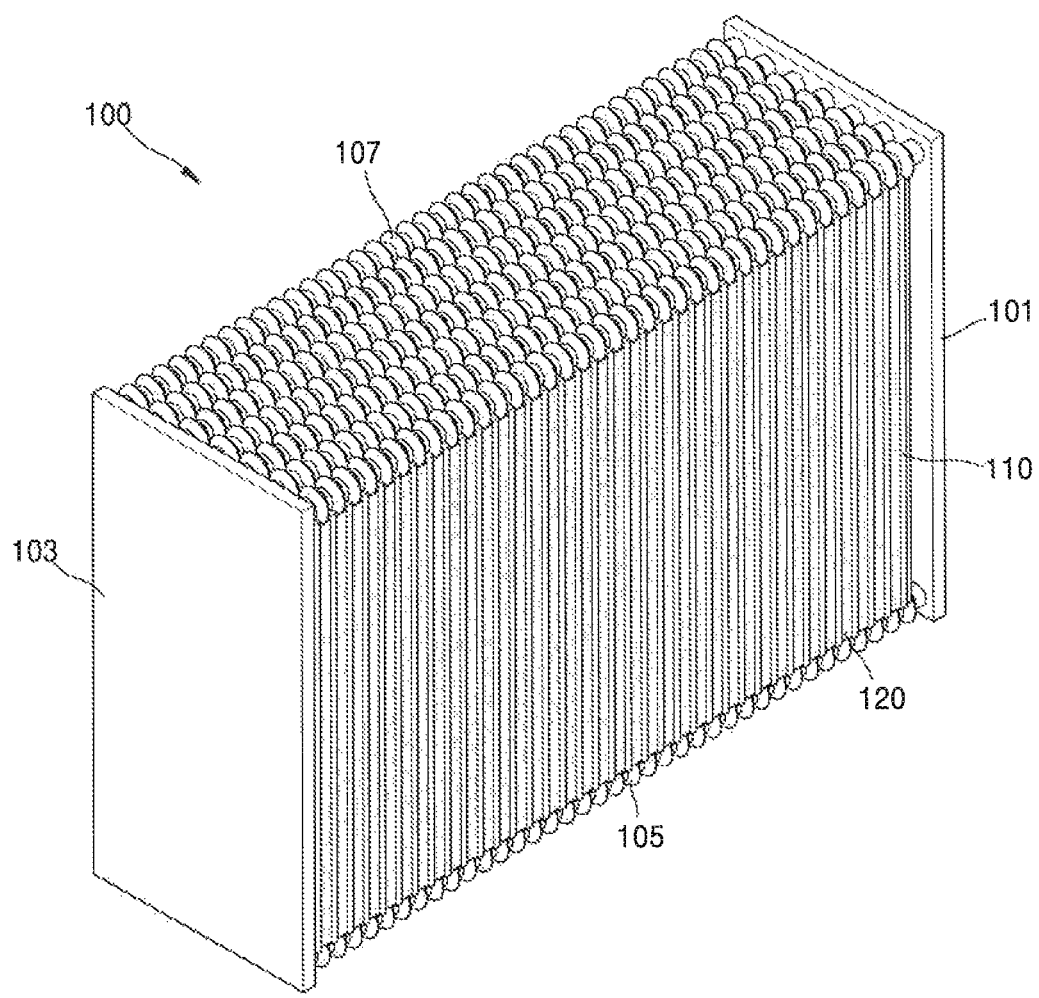
FIG. 5A is a perspective view schematically illustrating a state in which sheets of glass and auxiliary layers are inserted into a loading unit, according to an embodiment of the present inventive concept.
Figure 5B:
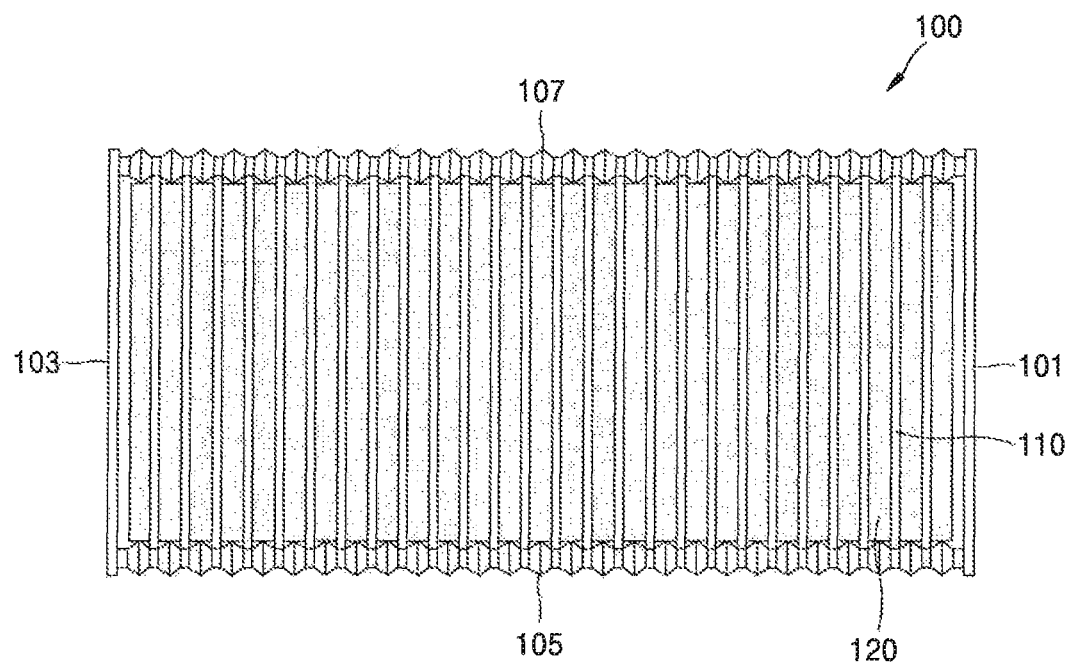
FIG. 5B is a cross-sectional view schematically illustrating a state in which sheets of glass and auxiliary layers are inserted into a loading unit, according to an embodiment of the present inventive concept.
Figure 5C:
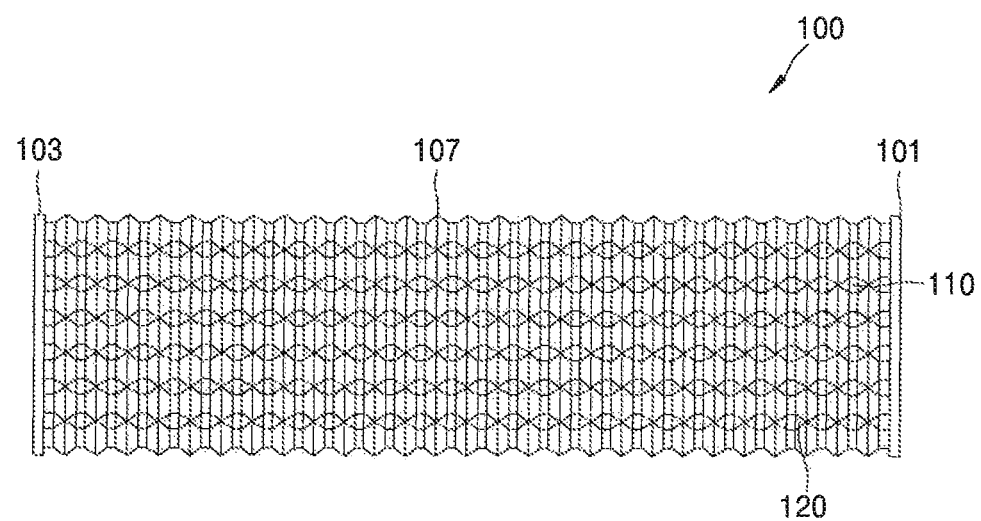
FIG. 5C is a plan view schematically illustrating a state in which sheets of glass and auxiliary layers are inserted into a loading unit, according to an embodiment of the present inventive concept.

FIG. 5A is a perspective view schematically illustrating a state in which sheets of glass and auxiliary layers are inserted into a loading unit, according to an embodiment, FIG. 5B is a cross-sectional view schematically illustrating a state in which sheets of glass and auxiliary layers are inserted into a loading unit, according to an embodiment, and FIG. 5C is a plan view schematically illustrating a state in which sheets of glass and auxiliary layers are inserted into a loading unit, according to embodiments of the present inventive concept.

For example, FIGS. 5A to 5C schematically show a portion of the loading unit 100 while a residual salt removal process is performed after a tempering process. In an embodiment, residual salt rs (see FIG. 9) may be provided on surfaces of sheets of glass 110 loaded in the loading unit 100.

As shown in FIGS. 5A to 5C, the auxiliary layers 120 may be inserted into spaces between the sheets of glass 110 that are spaced apart from one another. For example, the auxiliary layers 120 may be inserted between the sheets of glass 110 in which residual salt rs is provided on surfaces thereof.

In an embodiment, the auxiliary layers 120 inserted into the loading unit 100 may come into direct contact with residual salt rs (see FIG. 9) provided on surfaces of sheets of glass 110 adjacent to the auxiliary layers 120. Accordingly, the auxiliary layers 120 may perform an ion substitution reaction with the residual salt rs provided on the surfaces of the adjacent sheets of glass 110. The ion substitution reaction may include a reaction in which at least a portion of ions included in the residual salt rs are substituted with ions included in the auxiliary layers 120. Through the ion substitution reaction described above, a melting point or viscosity of the residual salt rs may decrease, and thus, the amount of removal of the residual salt rs may be increased.

For example, a viscosity of the residual salt rs (see FIG. 9) after the ion substitution reaction between the sheets of glass 110 and the auxiliary layers 120 may be less than that of the residual salt rs before the ion substitution reaction. In addition, a melting point of the residual salt rs after the ion substitution reaction between the sheets of glass 110 and the auxiliary layers 120 may be less than a melting point before the ion substitution reaction. Such an ion substitution reaction will be described later in detail with reference to FIG. 10.

Figure 6:
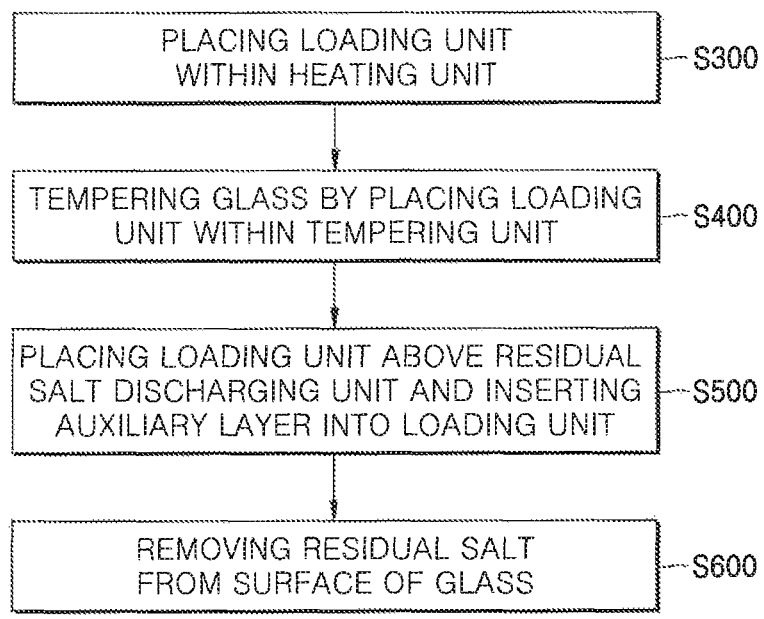
FIG. 6 is a flowchart of a portion of a method of manufacturing tempered glass, according to an embodiment of the present inventive concept.

FIG. 6 is a flowchart of a portion of a method of manufacturing tempered glass, according to an embodiment, and FIGS. 7 to 10 are cross-sectional views sequentially illustrating a portion of a process of manufacturing tempered glass, according to an embodiment.

As shown in FIG. 6, a method of manufacturing tempered glass, according to an embodiment, may include placing the loading unit 100 having sheets of glass 110 loaded therein within the heating unit 10 in block S300, tempering the glass 110 by placing the loading unit 100 within the tempering unit 20 in block S400, placing the loading unit 100 above the residual salt discharging unit 30 and inserting the auxiliary layers 120 into the loading unit 100 in block S500, and removing residual salt rs from a surface of the glass 110 in block S600.

The placing of the loading unit 100 within the heating unit 10 in block S300 may include placing the loading unit 100 which has sheets of glass 110 to be tempered loaded therein, into the heating unit 10. In an embodiment, the loading unit 100 may be placed into the heating unit 10 from the outside through the first open and close unit 61 (see FIG. 2) arranged in the lateral side portion of the heating unit 10. In an embodiment, a plurality of sheets of glass 110 may be loaded in the loading unit 100 described above so that a tempering process may be performed on the plurality of sheets of glass 110 simultaneously.

Figure 7:
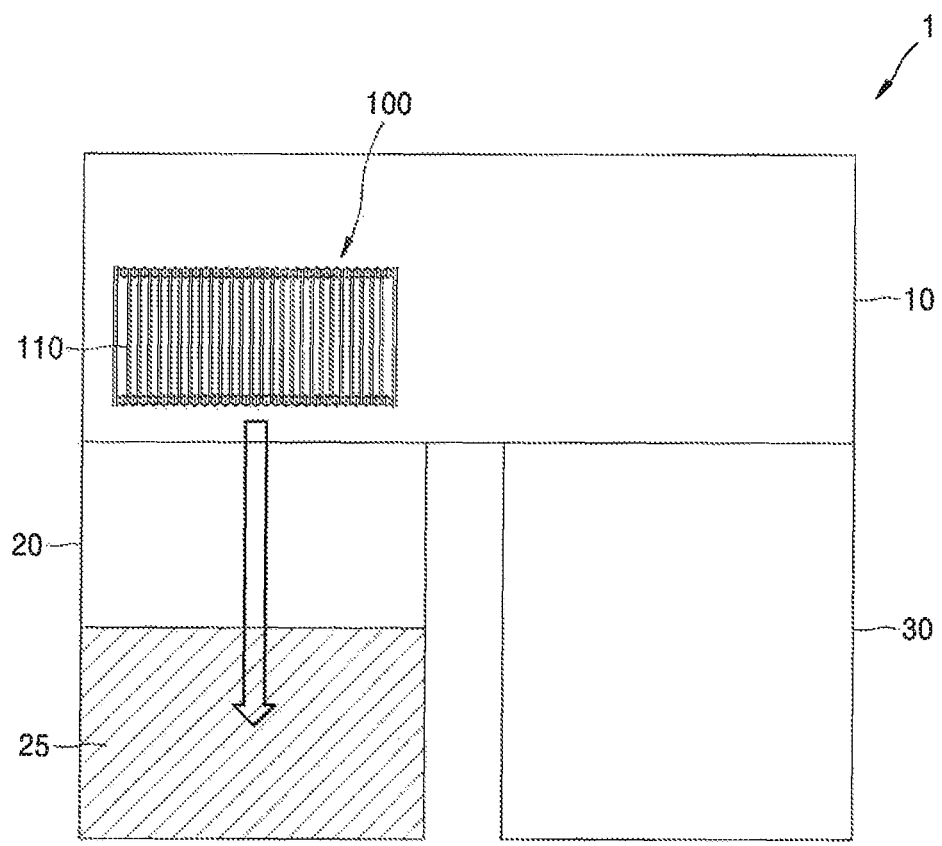
FIGS. 7 to 10 are cross-sectional views sequentially illustrating a portion of a process of manufacturing tempered glass, according to embodiments of the present inventive concept.

Referring to FIG. 7, the loading unit 100 placed into the heating unit 10 may be arranged above the tempering unit 20. For example, after the loading unit 100 is placed into the heating unit 10, the loading unit 100 may move in left and right directions in a cross-sectional view to be arranged above the tempering unit 20.

In an embodiment, in the present operation, a temperature in the heating unit 10 may be controlled to be within a preheating temperature range. In addition, because the heating unit 10 and the tempering unit 20 are connected to each other through a first opening defined in a lower surface of the heating unit 10, a temperature in the heating unit 10 and a temperature in the tempering unit 20 may be same as or similar to each other. Such temperature control may be performed by the controller 50 (see FIG. 2) electrically connected to the heating unit 10.

In an embodiment, the tempering of the glass 110 by placing the loading unit 100 within the tempering unit 20 in block S400 may include performing a chemical tempering process by dipping the loading unit 100 into the tempering solution 25 contained within the tempering unit 20.

Figure 8:
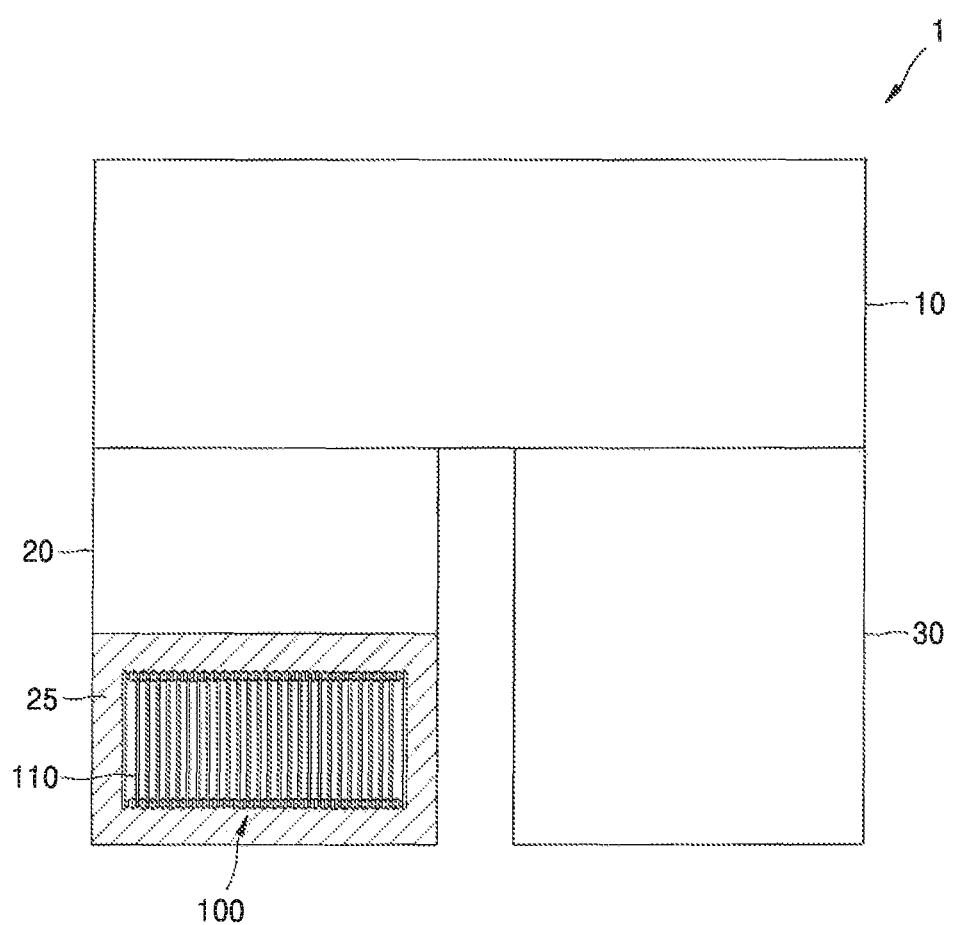

Referring to FIG. 8, the loading unit 100 arranged above the tempering unit 20 may descend (e.g., move downwardly) in a direction toward the tempering unit 20 so that the tempering process may be performed. In this embodiment, the loading unit 100 may move into the tempering unit 20 from within the heating unit 10 through a first opening provided in the lower surface of the heating unit 10. The loading unit 100, which has moved into the tempering unit 20, may be dipped into the tempering solution 25 contained within the tempering unit 20. As described above, because the sheets of glass 110 loaded in the loading unit 100 are spaced apart from one another, the tempering solution 25 may be filled between the sheets of glass 110 and may come into direct contact with surfaces of the sheets of glass 110. The tempering solution 25 that directly contacts the surfaces of the sheets of glass 110 may temper the sheets of glass 110 through an ion exchange process.

In an embodiment, the tempering solution 25 may include a first ion, and the sheets of glass 110 prior to the tempering process may include a second ion. The ion exchange process may include a process of dipping the sheets of glass 110 in the tempering solution 25 including the first ion, and substituting at least a portion of a second ion included in surfaces of the sheets of glass 110 with the first ion included in the tempering solution 25. The tempering solution 25 used in the ion exchange process may be in a liquid state at a high temperature. A temperature in the tempering unit 20 may be maintained to be in a tempering temperature range greater than or equal to a melting point of the tempering solution 25. For example, in an embodiment, during a tempering process, the tempering temperature range may be controlled to be within a range of about 350° C. to about 400° C., for example, about 360° C. to about 370° C.

As pores of the surfaces of the sheets of glass 110 contained in the tempering solution 25 in a liquid state at a high temperature expand, the second ion within the sheets of glass 110 may be discharged to the outside, and an external first ion may be filled in a place where the second ion has been discharged. An ion radius of the first ion included in the tempering solution 25 may be greater than that of the second ion included in the sheets of glass 110. For example, in the ion exchange process, an ion of a surface of the sheets of glass 110 is substituted with an ion having a relatively large ion radius, thereby generating compression stress in a surface area of the sheets of glass 110. Thus, a strength characteristic of the sheets of glass 110 may be increased.

The positioning of the loading unit 100 above the residual salt discharging unit 30, the inserting of the auxiliary layers 120 into the loading unit 100 in block S500, and the removing of the residual salt rs from the surface of the glass 110 in block S600 may include an operation of performing a residual salt removal process for removing the residual salt rs provided on the surfaces of the sheets of glass 110 during a tempering process.

Figure 9:
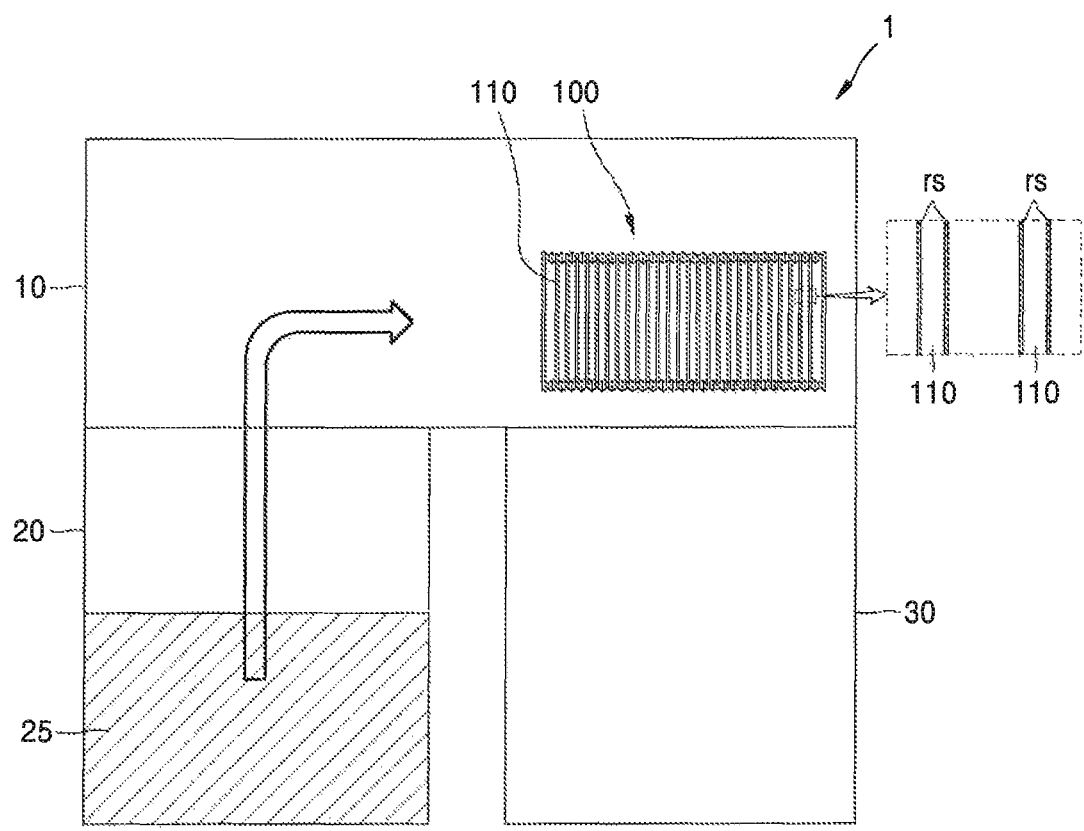

Referring to FIG. 9, when the tempering process is completed, the loading unit 100 may be elevated (e.g., moved upwardly) in a direction toward the heating unit 10 and may move into the heating unit 10 via a first opening. Subsequently, the loading unit 100 may move in left and right directions in a cross-sectional view and may be arranged above the residual salt discharging unit 30. In this embodiment, the loading unit 100 may overlap the residual salt discharging unit 30, and may be arranged on a second opening defined in a lower surface of the heating unit 10 so as to overlap the second opening.

In addition, the residual salt rs may be provided on the surfaces of the sheets of glass 110 loaded in the loading unit 100. The residual salt rs may be solidified on the surfaces of the sheets of glass 110 to form interfacial stress, which may lower the quality of the tempered glass and cause defects of the manufactured tempered glass. Thus, a residual salt removal process may be performed to remove the residual salt rs to prevent a decrease in the quality of the manufactured tempered glass and to prevent an increase in defects of the manufactured tempered glass. When a melting point of the residual salt rs is relatively high, the residual salt rs may be solidified even under high temperature conditions, and thus, the mobility thereof may be lowered, and the residual salt rs may not be easily removed from a surface of the glass 110. In addition, when a viscosity of the residual salt rs is relatively large, the mobility of the residual salt rs may be deteriorated, and the residual salt rs may not be easily removed from the surface of the glass 110. The residual salt removal process included in the method of manufacturing tempered glass may include a residual salt preprocessing process that uses the auxiliary layers 120, and thus, there may be an increase in the removal of the residual salt rs. In this embodiment, "the residual salt preprocessing process" may include a process of inducing an ion substitution reaction by inserting the auxiliary layers 120 between the sheets of glass 110 that have a surface having residual salt rs formed thereon, and may refer to a process for facilitating the removal of the residual salt rs.

Figure 10:
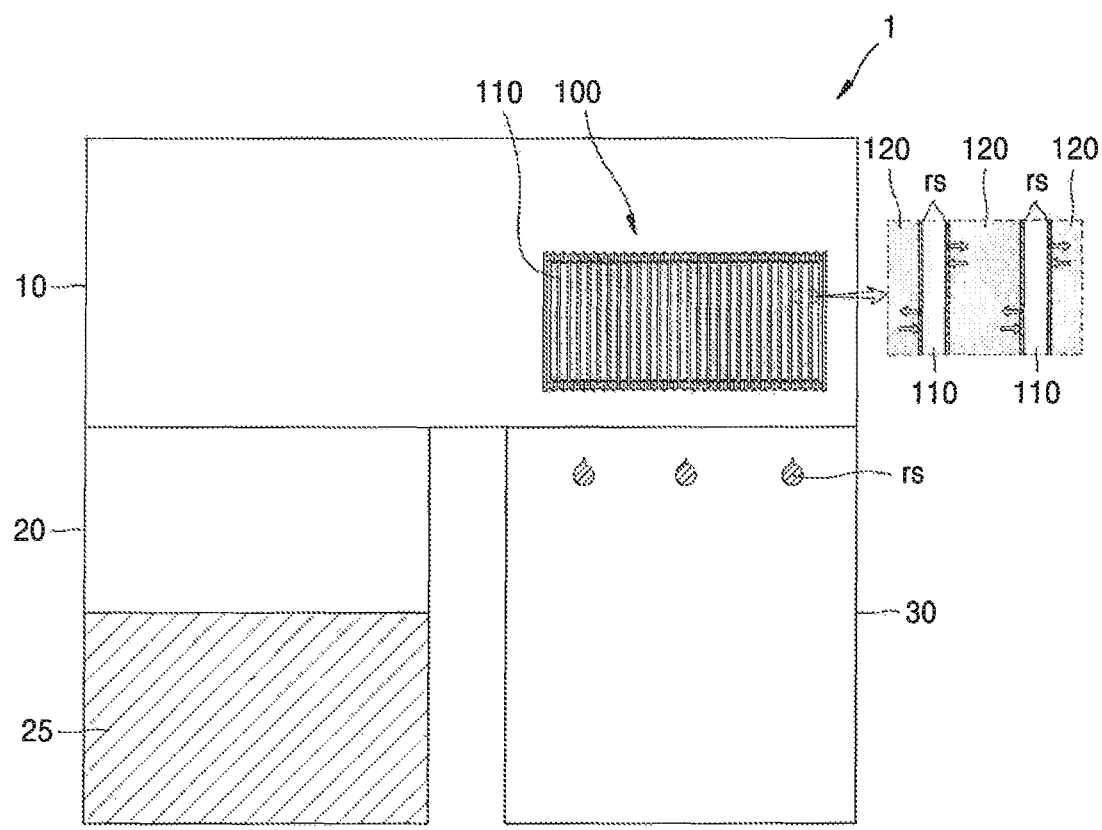

Referring to FIG. 10, when the loading unit 100 is arranged above the residual salt discharging unit 30, the auxiliary layer providing unit 40 (see FIG. 2) described above may provide the auxiliary layers 120 into the heating unit 10. The provided auxiliary layers 120 may be inserted adjacent to the sheets of glass 110 on which the residual salt rs is formed. The auxiliary layers 120 may be adjacent to the sheets of glass 110 so as to directly contact the residual salt rs formed on surfaces of the sheets of glass 110. The auxiliary layers 120 that are inserted may perform an ion substitution reaction with the residual salt rs formed on the surfaces of the sheets of glass 110 adjacent to the auxiliary layers 120.

In an embodiment, the auxiliary layers 120 may include a third ion, and the residual salt rs formed on the surfaces of the sheets of glass 110 may include a fourth ion. The ion substitution reaction may include a reaction in which at least a portion of the fourth ion included in the residual salt rs is substituted with the third ion included in the auxiliary layers 120. A viscosity of the residual salt rs after the ion substitution reaction between the sheets of glass 110 and the auxiliary layers 120 may be less than that of the residual salt rs before the ion exchange reaction. In addition, a melting point of the residual salt rs after the ion substitution reaction between the sheets of glass 110 and the auxiliary layers 120 may be less than a melting point of the residual salt rs before the ion substitution reaction. As a result, through the residual salt preprocessing process, such as the ion substitution reaction provided thereby, the melting point and viscosity of the residual salt rs may be relatively lowered, thus preventing solidification of the residual salt rs under a process temperature, and increasing the flowability of the residual salt rs for removal thereof.

For example, in an embodiment, the residual salt rs may include an ion included in the tempering solution 25. For example, in an embodiment in which the tempering solution 25 includes a potassium ion ($K^+$) as in potassium nitride ($KNO_3$), the fourth ion included in the residual salt rs may be the potassium ion ($K^+$). In addition, the third ion included in the auxiliary layers 120 may be a sodium ion ($Na^+$) or a lithium ion ($Li^+$). A detailed description of a melting point reduction effect when the potassium ion ($K^+$) included in the residual salt rs is substituted with the sodium ion ($Na^+$) or the lithium ion ($Li^+$) will be provided below, with reference to FIGS. 11A and 11B.

The residual salt rs, which has undergone the residual salt preprocessing process, such as the ion substitution reaction provided thereby, may move downward, such as by gravity. The residual salt rs that has moved downward may be separated from the surfaces of the sheets of glass 110 and may move into the residual salt discharging unit 30 via the second opening. The residual salt discharging unit 30 may receive and discharge the residual salt rs introduced from the heating unit 10.

In an embodiment, the residual salt discharging unit 30 may have an upper surface having a mesh structure. Accordingly, the residual salt rs may move from the heating unit 10 into the residual salt discharging unit 30 by passing through the upper surface of the residual salt discharging unit 30 via holes included in the mesh structure.

When the residual salt removal process is completed, the auxiliary layers 120 may be separated from the loading unit 100. In an embodiment, the auxiliary layers 120 that are separated may move to the auxiliary layer providing unit 40

(see FIG. 2). In addition, the loading unit 100 from which the auxiliary layers 120 are removed may be discharged to (e.g., moved to) the outside of the heating unit 10, such as through the first open and close unit 61.

In addition, the method of manufacturing tempered glass according to an embodiment may include cooling the sheets of glass 110, and cleaning the sheets of glass 110. The cooling and the cleaning may be performed inside and/or outside of the tempered glass manufacturing apparatus 1. However, embodiments of the present inventive concept are not limited thereto and at least a portion of the operations may be omitted.

Figure 11A:
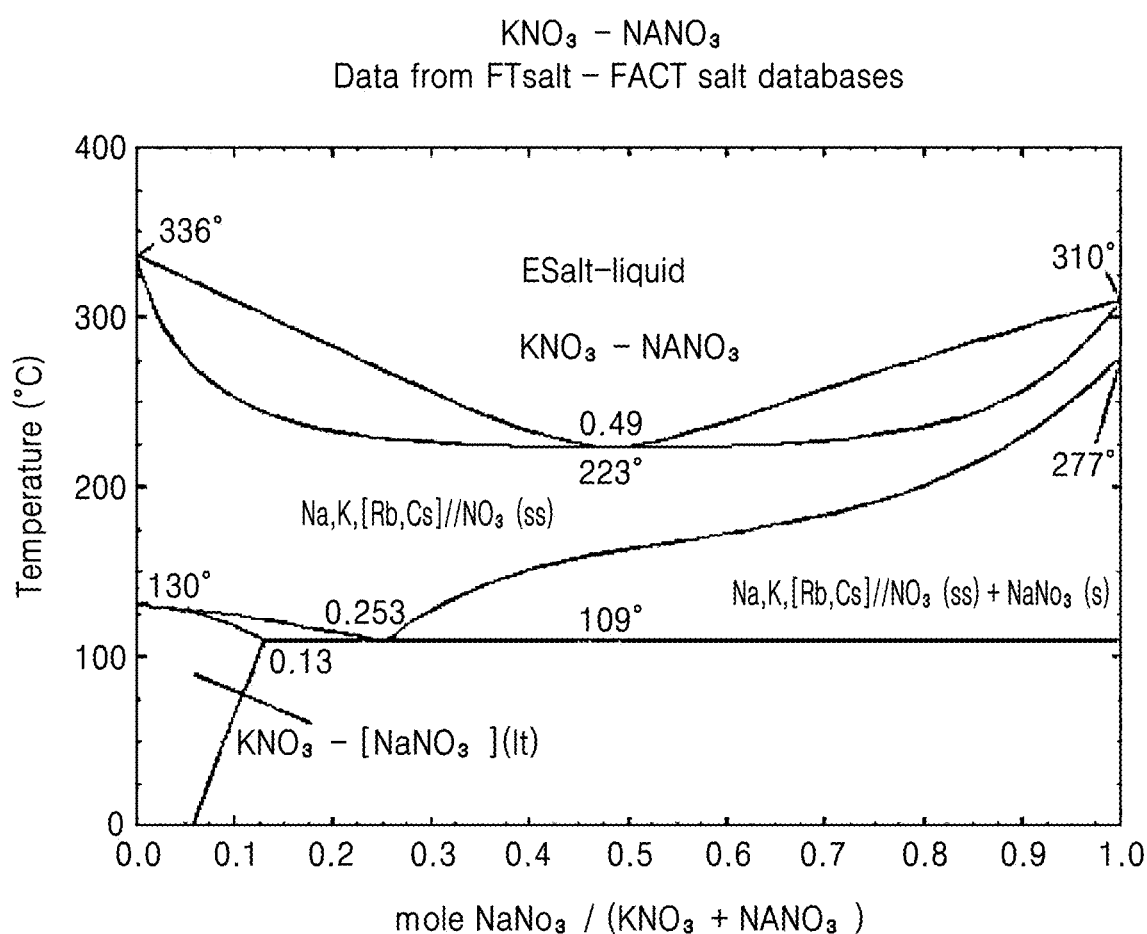
FIGS. 11A and 11B are phase equilibrium diagrams of residual salt after an ion substitution reaction, according to embodiments of the present inventive concept.
Figure 11B:
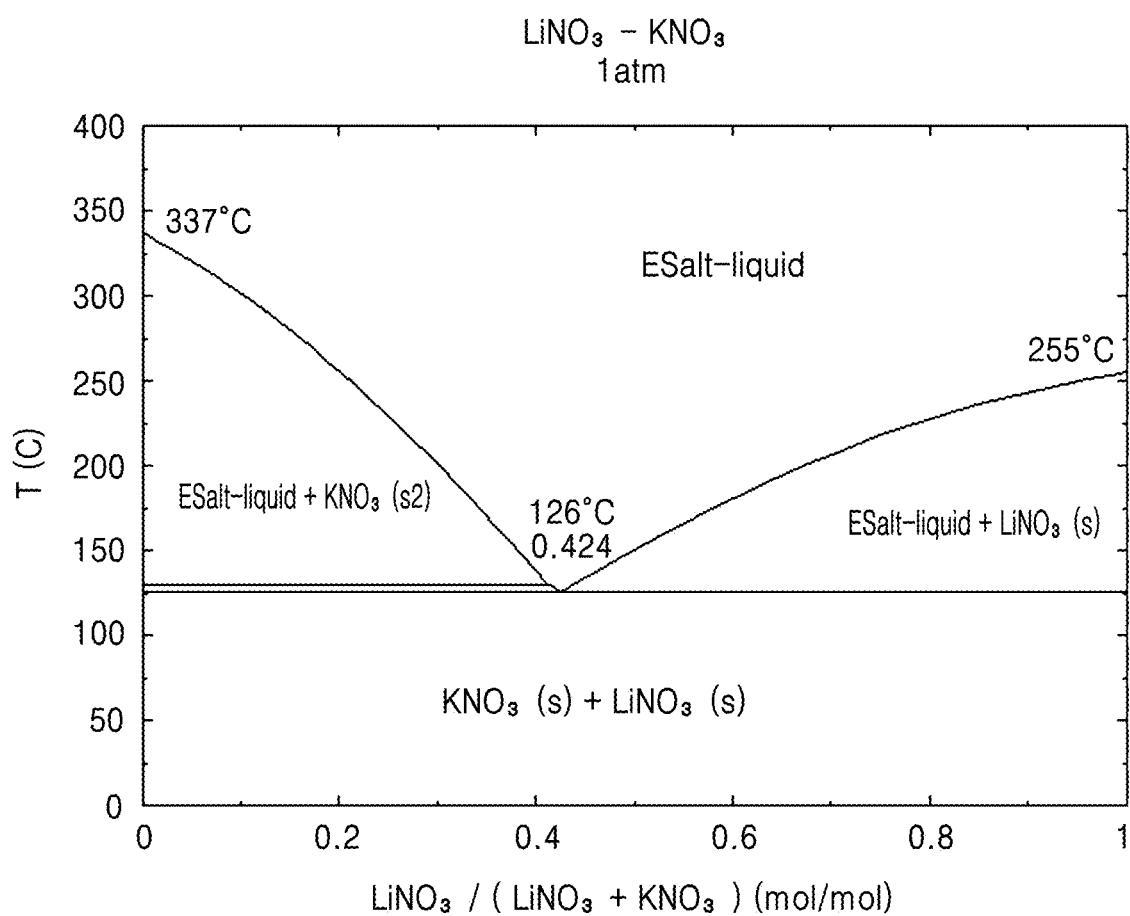

FIGS. 11A and 11B are phase equilibrium diagrams of residual salt after an ion substitution reaction according to embodiments of the present inventive concepts.

For example, FIG. 11A is a phase equilibrium diagram of the residual salt rs (see FIG. 1) when the residual salt preprocessing process described above is performed by using the auxiliary layers 120 (see FIG. 10) including a sodium ion (Na$^+$). For example, FIG. 11A is a phase equilibrium diagram of residual salt rs in which at least a portion of an ion included in the residual salt rs is substituted with a sodium ion (Na$^+$). In addition, FIG. 11B is a phase equilibrium diagram of the residual salt rs when the residual salt preprocessing process described above is performed by using the auxiliary layers 120 including a lithium ion (Li$^+$). For example, FIG. 11B is a phase equilibrium diagram of the residual salt rs in which at least a portion of an ion included in the residual salt rs is substituted with a lithium ion (Li$^+$).

Referring to FIG. 11A, in an embodiment, a melting point of the residual salt rs, in which at least a portion of an ion included in the residual salt rs is substituted with a sodium ion (Na$^+$), is lowered to at least about 225° C. In addition, referring to FIG. 11B, in an embodiment, a melting point of the residual salt rs, in which at least a portion of an ion included in the residual salt rs is substituted with a lithium ion (Li$^+$), is lowered to at least about 125° C.

As described above, as the melting point of the residual salt rs decreases, the solidification of the residual salt rs in the tempering process or the post heating process described above may be prevented or minimized, and thus, the degradation of quality and defects of the manufactured tempered glass may be prevented or minimized.

According to embodiments of the present inventive concept described above, an apparatus and method for manufacturing tempered glass in which an effect of removing residual salt provided on a glass surface during a tempering process is increased may be implemented. However, the scope of the present inventive concept are not limited by this effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present inventive concept.

What is claimed is:

1. A tempered glass manufacturing apparatus comprising:
   a loading unit configured for loading sheets of glass therein;
   a heating unit configured to receive the loading unit having sheets of glass loaded therein, the heating unit includes first to third openings;
   a tempering unit connected to the heating unit through the first opening and configured to receive the loading unit having sheets of glass loaded therein, the tempering unit is configured for performing a tempering process on the sheets of glass when the loading unit is positioned in the tempering unit;
   a residual salt discharging unit connected to the heating unit through the second opening; and
   an auxiliary layer providing unit connected to the heating unit through the third opening of the heating unit, the auxiliary layer providing unit including auxiliary layers for performing a residual salt preprocessing process to increase a removal of residual salt provided on surfaces of the sheets of glass.

2. The tempered glass manufacturing apparatus of claim 1, wherein:
   a tempering solution including a first ion is disposed within the tempering unit; and
   the tempering process includes a process of substituting at least a portion of a second ion included in the sheets of glass with the first ion by dipping the loading unit having the sheets of glass loaded therein in the tempering solution.

3. The tempered glass manufacturing apparatus of claim 2, wherein an ion radius of the first ion is greater than an ion radius of the second ion.

4. The tempered glass manufacturing apparatus of claim 1, wherein an upper surface of the residual salt discharging unit is configured to receive residual salt that is displaced from the sheets of glass loaded in the loading unit.

5. The tempered glass manufacturing apparatus of claim 4, wherein the upper surface of the residual salt discharging unit has a mesh structure.

6. The tempered glass manufacturing apparatus of claim 1, wherein the auxiliary layer providing unit provides the auxiliary layers into the heating unit when the loading unit is arranged on the second opening of the heating unit.

7. The tempered glass manufacturing apparatus of claim 6, wherein the auxiliary layers provided into the heating unit are inserted between the sheets of glass, respectively, and directly contact the residual salt provided on the surfaces of the sheets of glass.

8. The tempered glass manufacturing apparatus of claim 7, wherein:
   the auxiliary layers include a third ion; and
   the residual salt preprocessing process includes an ion substitution reaction that is performed when the residual salt provided on the surfaces of the sheets of glass directly contacts the auxiliary layers, the ion substitution reaction including a substitution of at least a portion of a fourth ion included in the residual salt with the third ion.

9. The tempered glass manufacturing apparatus of claim 8, wherein a viscosity of the residual salt after the ion substitution reaction is less than a viscosity of the residual salt before the ion substitution reaction.

10. The tempered glass manufacturing apparatus of claim 8, wherein a melting point of the residual salt after the ion substitution reaction is less than a melting point of the residual salt before the ion substitution reaction.

11. A method of manufacturing tempered glass, the method comprising:

placing a loading unit having sheets of glass loaded therein within a heating unit having first to third openings;

moving the loading unit into a tempering unit through the first opening of the heating unit, and tempering the sheets of glass;

placing the loading unit on the second opening within the heating unit after the tempering of the sheets of glass;

receiving auxiliary layers from an auxiliary layer providing unit through the third opening of the heating unit, and inserting the auxiliary layers between the sheets of glass, respectively; and discharging residual salt provided on surfaces of the sheets of glass into a residual salt discharging unit through the second opening.

12. The method of claim 11, wherein:

a tempering solution including a first ion is disposed within the tempering unit; and the tempering of the sheets of glass includes dipping the loading unit in the tempering solution, and substituting at least a portion of a second ion included in the sheets of glass with the first ion.

13. The method of claim 12, wherein an ion radius of the first ion is greater than an ion radius of the second ion.

14. The method of claim 11, wherein the residual salt is movable into the residual salt discharging unit from the sheets of glass loaded in the loading unit via an upper surface of the residual salt discharging unit.

15. The method of claim 14, wherein the upper surface of the residual salt discharging unit has a mesh structure.

16. The method of claim 11, wherein:

the auxiliary layer providing unit includes auxiliary layers for performing a residual salt preprocessing process to increase a removal of the residual salt formed on the surfaces of sheets of glass; and the auxiliary layer providing unit provides the auxiliary layers into the heating unit when the loading unit is arranged on the second opening of the heating unit.

17. The method of claim 16, wherein the auxiliary layers provided into the heating unit are inserted between the sheets of glass, respectively, and directly contact the residual salt provided on the surfaces of the sheets of glass.

18. The method of claim 17, wherein:

the auxiliary layers include a third ion; and the residual salt preprocessing process includes an ion substitution reaction that is performed when the residual salt directly contacts the auxiliary layers, the ion substitution reaction including a substitution of at least a portion of a fourth ion included in the residual salt with the third ion.

19. The method of claim 18, wherein a viscosity of the residual salt after the ion substitution reaction is less than a viscosity of the residual salt before the ion substitution reaction.

20. The method of claim 18, wherein a melting point of the residual salt after the ion substitution reaction is less than a melting point of the residual salt before the ion substitution reaction.

* * * * *